2,917,489
PROCESS FOR CURING LIQUID URETHANE POLYMERS

Edward K. Gladding, New Castle, and Frederic B. Stilmar, Wilmington, Del., assignors to E. I. du Pont de Nemours and Company, Wilmington, Del., a corporation of Delaware No Drawing. Application March 16, 1956
Serial No. 571,874

5 Claims. (Cl. 260—77.5)

This invention relates to a process for curing diisocyanate compositions and more particularly to a process for curing liquid diisocyanate compositions so as to produce elastomers having improved tear strength.

Heretofore in the preparation and curing of elastomers from liquid diisocyanate compositions, the liquid compositions have been poured into appropriate molds and then cured by heating with or without pressure. Another method which has been used is the centrifugal molding technique whereby the liquid composition is forced into a rotating mold and the mold is then heated while it is being rotated. Each of these processes is a very convenient method of operation for forming shaped elastomers; however, the resulting elastomers have been decidedly inferior in their tear strength properties.

It is an object of the present invention to provide a process for preparing elastomers from liquid diisocyanate compositions. A further object is to provide a process for curing liquid diisocyanate compositions so as to yield elastomers having improved tear strength. Other objects will appear hereinafter.

These and other objects of the following invention are accomplished by the process of preparing elastomers having improved tear strength from liquid, curable diisocyanate compositions which comprises mixing at a temperature of from 50 to 100° C. (a) a liquid isocyanate-terminated polymer having the formula

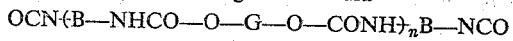

wherein O—G—O is a bivalent radical obtained by removing the terminal hydrogen atoms from a polymeric glycol having a molecular weight of at least 750, said glycol being selected from the group consisting of polyalkylene ether glycols, polyalkylene-arylene ether glycols and polyalkylene ether-thioether glycols; B is a bivalent organic radical which is inert to isocyanate groups; and $n$ is an integer which is selected so that the molecular weight within the parentheses be not greater than 6,000, with (b) an active hydrogen-containing organic compound having active hydrogen atoms on at least two atoms selected from the group consisting of oxygen and nitrogen atoms, allowing the mixture to stand until it becomes a solid which is capable of being molded, followed by heating the said moldable solid under pressure. The above described, two-step process of preparing a cured elastomer from a liquid diisocyanate composition yields an elastomer having improved tear strength as compared to elastomers which are prepared by mixing a liquid isocyanate-terminated polymer with an active hydrogen-containing organic compound, followed immediately by heating under pressure.

The liquid isocyanate-terminated polymer which is used in the composition of the present invention is prepared by heating at a temperature of about 50 to 100° C. a polymeric glycol having a molecular weight of at least 750 with a molar excess of an organic diisocyanate. The resulting polymer has the formula

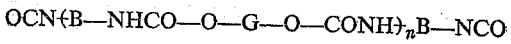

wherein O—G—O, B and $n$ have the values defined above. The molar ratio of organic diisocyanate to polymeric glycol determines the value of $n$ in the formula. For purposes of the present invention, the value of $n$ may be from 1 to about 7. When the molar ratio of diisocyanate to glycol is 2:1, the value of $n$ will theoretically be 1; however, for purposes of the present invention, a molar ratio of from 1.2:1 to about 3:1 is preferred. At the higher molar ratios, there will be some free organic diisocyanate present in the polymer which will subsequently function as a cross-linking agent when the mixture of isocyanate-terminated polymer and active hydrogen-containing organic compound is finally cured by heating under pressure. The presence of free organic diisocyanate in the polymer is particularly desirable when higher molecular weight polymeric glycols are being used since it tends to effect a decrease in the viscosity of the mixture. The molecular weight of the polymeric glycol and the molar ratio of organic diisocyanate to glycol should be selected so that the value of $n$ in the above formula is such that the molecular weight within the parentheses be not greater than 6,000. This molecular weight limitation is chosen since at molecular weights much above 6,000, the isocyanate-terminated polymer is not a liquid.

Of the polymeric glycols which are reacted with a molar excess of an organic diisocyanate so as to prepare the isocyanate-terminated polymer, the polyalkylene ether glycols are preferred. These glycols have the general formula $H(OR)_xOH$, wherein R is an alkylene radical which need not necessarily be the same in each instance and $x$ is an integer so that the molecular weight of the glycol be at least 750. They may be prepared by the polymerization of cyclic ethers such as ethylene oxide, propylene oxide, dioxolane or tetrahydrofuran. For purposes of the present invention, the preferred polyalkylene ether glycol is a polytetramethylene ether glycol.

The polyalkylene ether-thioether glycols used to react with a molar excess of an organic diisocyanate may be represented by the formula $HO(QY)_xH$, wherein Q represents hydrocarbon radicals at least some of which are alkylene, Y represents chalcogen atoms some of which are sulfur and the rest oxygen, and $x$ is an integer sufficiently large so that the glycol has a molecular weight of at least 750. These glycols may be conveniently prepared by condensing together various glycols and thiodiglycol in the presence of a catalyst such as p-toluene sulfonic acid.

The polyalkylene-arylene ether glycols which may also be used are similar to the polyalkylene ether glycols except that some arylene radicals are present. In general, the phenylene and naphthylene radicals are preferred with or without substituents such as alkyl or alkylene groups. These glycols may be conveniently prepared by reacting a cyclic ether, such as ethylene oxide, with an arylene glycol.

Any of a wide variety of organic diisocyanates may be used to react with the polymeric glycols, including aromatic, aliphatic and cycloaliphatic types. For purposes of the present invention, toluene-2,4-diisocyanate is preferred. Other representative diisocyanates, such as 4-methyl-1,3-cyclohexane-diisocyanate, 4-methoxy-m-phenylene diisocyanate, 4,4'-biphenyl diisocyanate, 4,4'-methylene-diphenyl diisocyanate, etc., may be used.

The active hydrogen-containing organic compounds which are used in the process of the present invention should have the active hydrogen atoms present on at least two atoms of oxygen and/or nitrogen; i.e., they should be amine, carboxyl or hydroxyl groups. The term "active hydrogen atoms" refers to hydrogens which, because of their position in the molecule, display activity according to the Zerewitinoff test as described by Kohler in J. Am. Chem. Soc. 49, 3181 (1927). Representative compounds which may be used include dichlorobenzidine, 4,4'-methylene-bis-(2 - chloroaniline), 3,3 - dichloro-4,4'-biphenyldiamine, 2,6-diaminopyridine, 4,4'-dihydroxydiphenyl, ethanolamine, aminobenzoic acid, butane-1,4-diol, polytetramethylene ether glycol, etc. In addition to the above compounds, other organic compounds containing more than two atoms having active hydrogens may be used, such as trimesic acid, glycerol, triethanolamine, 2,4,6-triaminotoluene, trimethylolpropane, etc. It is to be understood that mixtures of these various active hydrogen-containing organic compounds may be used and that water which acts as a chain-extender for isocyanate-terminated polymers may be used in admixture with any of the above described organic compounds. For purposes of the present invention, the aromatic diamines of reduced activity are preferred, such as 3,3'-dichloro-4,4'-biphenyldiamine.

The active hydrogen-containing organic compound should be intimately mixed with the liquid isocyanate-terminated polymer. If the organic compound is solid, it should be finely ground so that complete mixing with the polymer can take place. In general, the amount of organic compound to be used should be not less than an amount which yields at least 60% of the total number of active hydrogen atoms theoretically required to react with all of the isocyanate groups. The preferred amount of organic compound to be used is such that the number of active hydrogen atoms present in the compound be about 70 to 90% of the total number of free isocyanate groups present in the isocyanate-terminated polymer. This then leaves from about 10 to 30% of the isocyanate groups to act as cross-linking agents when the isocyanate-terminated polymer/active hydrogen-containing organic compound mixture is finally cured by heating under pressure. It is to be understood that greater or lesser amounts of active hydrogen-containing organic compounds may be used and, when diamines are used, the number of groups bearing active hydrogen atoms may approach or even exceed the number of free isocyanate groups in the polymer. When the active hydrogen-containing compound and isocyanate-terminated polymer mixture is allowed to stand, the mixture becomes partially solidified since the organic compound functions as chain-extending agent and increases the molecular weight of the polymer.

As pointed out above, the process of the present invention is a two-step process in that the liquid isocyanate-terminated polymer and active hydrogen-containing organic compound are first allowed to stand until the mixture becomes solid and then the reaction is finally completed by heating under pressure. This process may be carried out in several ways. The liquid mixture of isocyanate-terminated polymer and the organic compound may be poured into a mold and permitted to stand until it solidifies. The solid in the mold may then be subjected to pressure in a press while heating. Alternatively, the liquid mixture may be cast into a slab, which, on solidification, is placed in a suitable mold and put into a press which forces it into the mold, whereupon it is then heated. Another method which is available is putting the mixture, after it has solidified, into a screw extruder and injecting it into a mold and then heating under pressure. Any of the above methods produces an elastomer having improved tear strength.

As discussed above, the mixture of liquid isocyanate-terminated polymer and active hydrogen-containing organic compound in the first step should be allowed to stand until it becomes solid. It is to be understood that by the term "solid" as used throughout the present specification and claims is meant that the flow characteristics of the liquid disappear but that the mixture has not become solidified to the extent that it is not capable of being molded. Thus it is desirable that the mixture will hold its shape when removed from a mold but it may be somewhat tacky or of a cheesy nature so that it can be readily handled.

The length of time in the first step during which the mixture becomes solid is dependent on a number of factors, such as the temperature and the rate of reaction between the free isocyanate groups of the isocyanate-terminated polymer and the active hydrogen atoms of the organic compound. As is well known, amino groups react with isocyanate groups at a much faster rate than do hydroxyl or carboxyl groups and, therefore, a mixture containing an amine-terminated organic compound will require a shorter time than a hydroxyl-terminated compound. The length of time of standing in this first step may be shortened by heating the mixture; however, temperatures of over 100° C. should not be used. In general, temperatures of from about 18 to 30° C. with a length of time for standing of about 8 to 16 hours are preferred. After the mixture has become solid but is still capable of being molded, it is then subjected to heat under pressure so as to complete the reaction and cure the elastomer. The final curing step of subjecting the moldable solid to heat under pressure should be carried out at temperatures of about 120 to 180° C. under a pressure of from about 40 to several thousand pounds per square inch. This pressure can be applied by any convenient means, such as a hydraulic press, which is conventionally used in the rubber industry.

The elastomers which are prepared as a result of the process of the present invention have improved tear strength as will be more readily apparent by the following examples. This advantage is quite useful from a practical production standpoint in that the elastomers can be readily removed from molds without tearing or otherwise deforming the surface. The liquid, curable composition mixture may be used to form a wide variety of elastomeric products, such as the production of gaskets or the formation of elastomeric bonds between articles. The properties of the resulting elastomers may be varied by suitable compounding of the liquid isocyanate-terminated polymer prior to the time it is allowed to stand until it becomes a moldable solid. Conventional compounding agents may be used, such as carbon black, silica, plasticizers, etc.

The following examples will better illustrate the nature of the present invention; however, the invention is not intended to be limited to these examples. Parts are by weight unless otherwise indicated. The split-tear test by which the samples prepared in the examples are tested is performed as follows:

A sample test piece of dimensions about 1 to 2 inches long, 0.25 to 0.5 inch wide and about 0.1 inch thick is cut from a sheet or slab of the elastomer. A slit of about 0.5 to 0.75 inch long is cut with a sharp knife lengthwise of the sample and across the thickness and as nearly as possible centered widthwise.

The ends of the cut sections are clamped in the jaws of a stress-strain measuring device, such as an Instron Tester, and pulled at a rate of 5 to 20 inches per minute. The maximum force in pounds developed is recorded. The force in pounds divided by the thickness in inches is the split-tear strength in pounds per inch.

*Example 1*

A. 910 parts of polytetramethylene ether glycol of molecular weight 910 and 261 parts of toluene-2,4-diisocyanate are stirred together at 100° C. for 3 hours to form an isocyanate-terminated polymer having a molecular weight of 2340.

B. 56.2 parts of this polymer and 4.8 parts of 3,3'-dichlorobenzidine are mixed together at 90 to 100° C. for 10 minutes. This amount of 3,3'-dichlorobenzidine furnishes 80% of the theoretical number of active hydrogen atoms required to react with all of the isocyanate groups. Portions of this mixture are poured into molds. One mold, the control, is immediately cured in a press for 1.25 hours at 134° C. Another mold is permitted to stand at room temperature overnight after which it has become solid. The cure is then completed by heating in a press at 134° C. for one hour. Another sample is held 3 hours at 100° C., at which time it has become solid and the cure is completed by heating in a press for 2 hours at 134° C. The split-tear values of the samples are as follows:

|  | Split-tear lbs./inch |
|---|---|
| Control, cured immediately | 48 |
| Stand 3 hrs. at 100° C. and cured | 83 |
| Stand overnight at room temperature and cured | 185 |

C. Additional curable liquid mixes are made with the polymer using larger quantities of the dichlorobenzidine and the mixtures cured by the same procedure with the results shown in the following table:

| Parts Polymer | Parts Dichloro-benzidine | Percent of theoretical amount of active hydrogen atoms | Split-Tear, Lbs./Inch ||
|---|---|---|---|---|
|  |  |  | Control—Cured immediately | Process—Allowed to stand overnight |
| 57.2 | 5.4 | 90 | 80 | 125 |
| 57.2 | 5.7 | 95 | 90 | 180 |
| 57.2 | 6.6 | 110 | 78 | 160 |

*Example 2*

56.2 parts of the isocyanate-terminated polymer prepared as in Example 1 is mixed with 1.05 parts of 2,6-diaminopyridine and 2.4 parts of 3,3'-dichlorobenzidine at 80° C. for about 10 minutes. These diamines furnish 80% of the theoretical number of active hydrogen atoms required to react with all of the isocyanate groups.

Portions are poured into molds. The control is heated immediately in a press for 2 hours at 134° C. The other is permitted to stand overnight at room temperature and the cure is then completed by heating in a press at 134° C. for 2 hours. The split-tear on the control sample is 50 lbs. per inch and on the process sample is 80 lbs. per inch.

*Example 3*

57.2 parts of the isocyanate-terminated polymer of Example 1 is mixed with 0.89 part of 4,4'-dihydroxydiphenyl and 3.62 parts of 3,3'-dichlorobenzidine at 80 to 90° C. for 10 minutes. This furnishes 80% of the theoretical number of active hydrogen atoms required to react with all of the isocyanate groups.

Portions are poured into molds. The control sample is cured immediately by heating in a press at 134° C. for 2 hours. Another sample is permitted to stand 8 hours at room temperature and the cure is then completed by heating in a press for 2 hours at 134° C. The split-tear on the control is 40 lbs. per inch and on the process sample is 60 lbs. per inch.

When 5.1 parts of 4,4'-methylene-bis-(2-chloroaniline), which furnishes 80% of the theoretical number of active hydrogen atoms required to react with all of the isocyanate groups, is substituted for the curing agent in this example and the mixture allowed to stand overnight before completing the cure, the split-tear value is 80 lbs. per inch.

When 2.42 parts of 3,3'-dichlorobenzidine and 0.18 part of water, which furnish 80% of the theoretical number of active hydrogen atoms required to react with all of the isocyanate groups, are used for the curing agent in this example, the split-tear value is twice that of the control sample.

*Example 4*

1860 parts of polytetramethylene ether glycol of molecular weight 930, containing 0.018% water, and 468 parts of toluene-2,4-diisocyanate are heated together at 60 to 72° C. for 32 hours. The resulting isocyanate-terminated polyurethane polymer has a molecular weight of 3490.

55 parts of the above polymer is stirred with 0.55 part of benzene-1,3,5-tricarboxylic acid and 2.8 parts of 3,3'-dichlorobenzidine at 40 to 60° C. for 10 minutes and then at 60 to 80° C. for a short while. These compounds furnish 87% of the theoretical number of active hydrogen atoms required to react with all of the isocyanate groups. The viscous liquid is poured into molds and the control sample is cured immediately in a press at 134° C. for 2 hours. The process sample is allowed to stand overnight at room temperature and then the cure is completed by heating in a press at 134° C. for 2 hours. The split-tear value of the control is 80 lbs. per inch and of the process sample is 150 lbs. per inch.

When 2,6-diaminopyridine is substituted for the dichlorobenzidine in this example, the process sample again has approximately twice the split-tear value of the control.

*Example 5*

52 parts of the isocyanate-terminated polymer of Example 4 is mixed with 1.6 parts of 1,3-bis(3-isocyanato-p-tolyl)urea at 100 to 110° C. for 10 minutes. Then the mixture is cooled to 80 to 90° C. and 4 parts of 3,3'-dichlorobenzidine is mixed in for 10 minutes. This amount of 3,3'-dichlorobenzidine furnishes 80% of the theoretical number of active hydrogen atoms required to react with all of the isocyanate groups.

Portions are poured into molds. The control sample is cured immediately in a press at 134° C. for 2 hours. The process sample is permitted to stand 24 hours at room temperature and then the cure is completed by heating in a press for 2 hours at 134° C. The control sample has a split-tear value of 75 lbs. per inch while the process sample has a value of 125 lbs. per inch.

*Example 6*

55.8 parts of the isocyanate-terminated polymer of Example 4 is mixed with 0.87 part of 1,3-bis(3-isocyanato-p-tolyl)urea at 100 to 110° C. for 10 minutes and then 3.4 parts of polytetramethylene ether glycol of molecular weight 910 and 2.83 parts of 3,3'-dichlorobenzidine are mixed in at 80 to 100° C. for 10 minutes. The polytetramethylene ether glycol and 3,3'-bis(3-isocyanato-p-tolyl)urea furnish 80% of the theoretical number of active hydrogen atoms required to react with all of the isocyanate groups.

Portions of the liquid mixture are poured into molds. The control sample is cured immediately in a press at 134° C. for 2 hours. The process sample is permitted to stand overnight at room temperature and the cure is then completed by heating in a press for 2 hours at 134° C. The control sample has a split-tear value of 25 lbs. per inch and the process sample a value of 55 lbs. per inch.

As many widely different embodiments of this invention may be made without departing from the spirit and scope thereof, it is to be understood that this invention is not limited to the specific embodiments thereof except as defined in the appended claims.

What is claimed is:

1. The process of preparing elastomers having improved tear strength from liquid, curable diisocyanate compositions which comprises forming a liquid mixture by mixing at a temperature of from 50 to 100° C. (a) a liquid isocyanate-terminated polymer having the formula

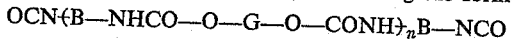

wherein O—G—O is a bivalent radical obtained by removing the terminal hydrogen atoms from a polymeric glycol having a molecular weight of at least 750, said glycol being selected from the group consisting of polyalkyleneether glycols, polyalkylene-aryleneether glycols and polyalkyleneether-thioether glycols; B is a bivalent organic radical which is inert to isocyanate groups; and $n$ is an integer which is selected so that the molecular weight within the parentheses be not greater than 6,000; with (b) an active hydrogen-containing organic compound having an active hydrogen atom, which is reactive with an isocyanate group, on at least two atoms selected from the group consisting of oxygen and nitrogen atoms; allowing said liquid mixture to stand at atmospheric pressure at a temperature of about 18 to 30° C. for from 8 to 24 hours to solidify said liquid mixture, said solidified mixture being capable of being molded; followed by heating said solidified moldable mixture to a temperature of about 120° to 180° C. under a pressure of at least 40 lbs./sq. in.

2. The process of claim 1 wherein the bivalent radical O—G—O is obtained by removing the terminal hydrogen atoms from a polyalkylene ether glycol having a molecular weight of at least 750.

3. The process of claim 1 wherein the bivalent radical O—G—O is obtained by removing the terminal hydrogen atoms from a polytetramethylene ether glycol having a molecular weight of at least 750.

4. The process of claim 3 wherein the bivalent organic radical B is a 2,4-tolylene radical.

5. The process of claim 4 wherein the active hydrogen-containing organic compound is 4,4'-methylenebis-(2-chloroaniline).

References Cited in the file of this patent

UNITED STATES PATENTS

| | | |
|---|---|---|
| 2,692,873 | Langerak et al. | Oct. 26, 1954 |
| 2,692,874 | Langerak | Oct. 26, 1954 |
| 2,734,045 | Nelson | Feb. 7, 1956 |
| 2,757,185 | Barthel | July 31, 1956 |

FOREIGN PATENTS

| | | |
|---|---|---|
| 519,014 | Belgium | Oct. 5, 1953 |
| 733,624 | Great Britain | July 13, 1955 |